March 10, 1970     J. SUNASKY     3,499,672

CONNECTIONS BETWEEN STRUCTURAL COMPONENTS

Filed Aug. 7, 1967     3 Sheets-Sheet 1

Inventor
Joseph Sunasky
by Sommers & Young
Attorneys

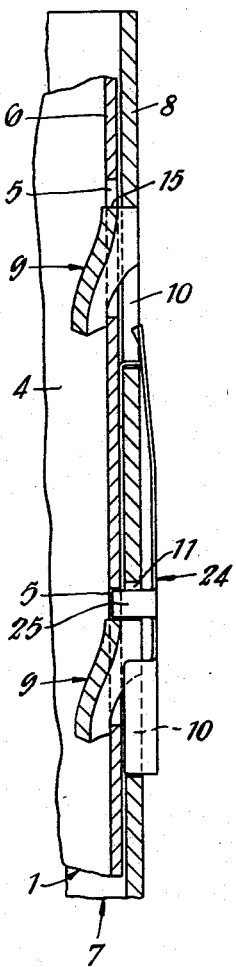
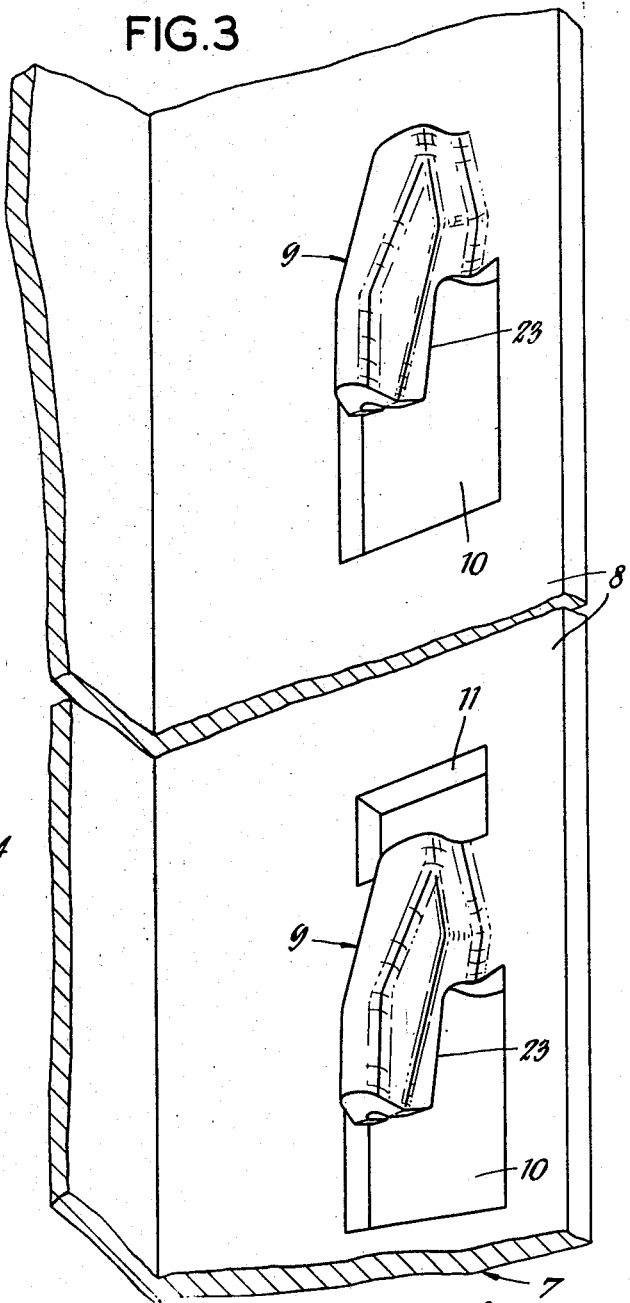

March 10, 1970 J. SUNASKY 3,499,672
CONNECTIONS BETWEEN STRUCTURAL COMPONENTS
Filed Aug. 7, 1967 3 Sheets-Sheet 3

Inventor
Joseph Sunasky
by Sommers + Young
Attorneys

United States Patent Office 3,499,672
Patented Mar. 10, 1970

3,499,672
CONNECTIONS BETWEEN STRUCTURAL
COMPONENTS
Joseph Sunasky, Wembley Park, England, assignor to
Dexion Limited, Wembley Park, England, a corporation of Great Britain
Filed Aug. 7, 1967, Ser. No. 658,927
Claims priority, application Great Britain, Aug. 8, 1966,
35,497/66
Int. Cl. F16b 1/00, 5/00, 7/00
U.S. Cl. 287—189.36
12 Claims

ABSTRACT OF THE DISCLOSURE

Improved hooks for connecting a horizontal beam to vertically disposed uprights in which the uprights are provided with vertically disposed, diamond-shaped openings with truncated top and bottom ends and the beam is provided with hollow, nose-shaped hooks projecting forwardly from a face of a portion of the beam, the nose-shaped hook having its side surfaces inclined downwardly toward one another as they approach the free end of the nose, bevelled or rounded lower ends on the side surfaces, a generally-flat edge or abutment at the top of the root of the nose, an inclined outer surface leading outwardly from the flat abutment toward the free end of the nose, and inner edges of the sides also inclined outwardly toward the free end of the nose. Resilient latching or locking devices are also mounted on the beam which project through the hole in the upright above the hook and prevent removal of the hook unless the latch is moved out of the hole.

Figure 1:
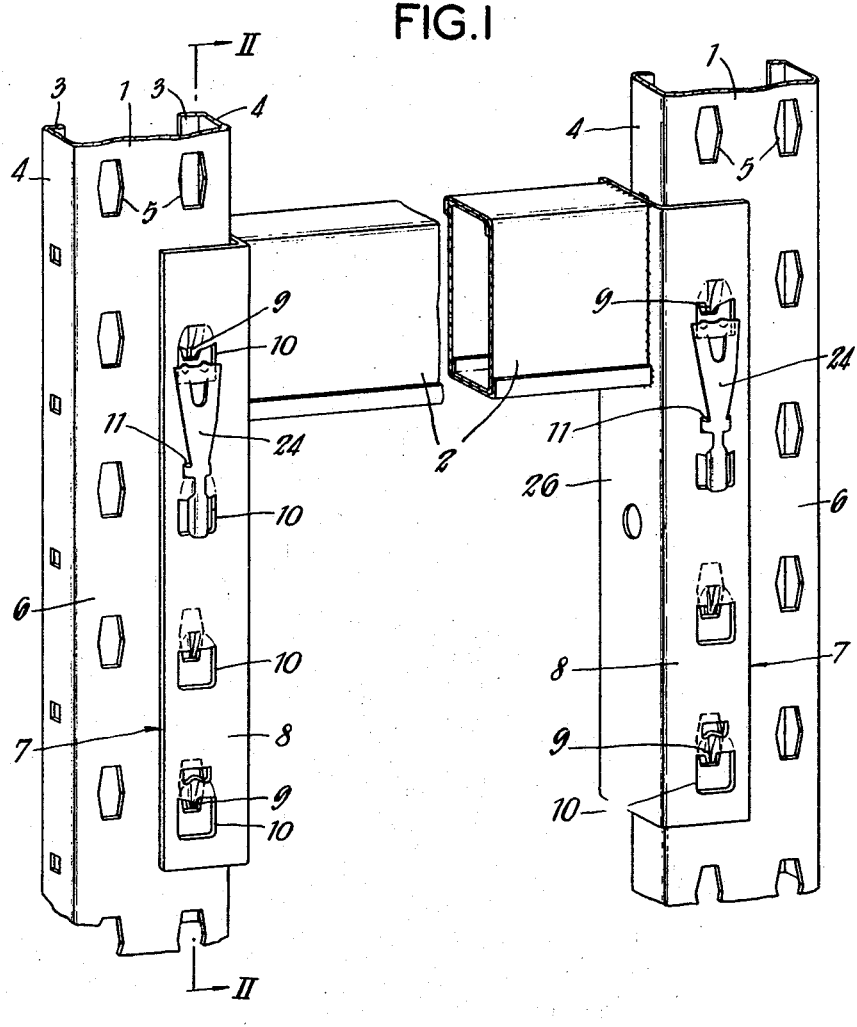

Briefly, the present invention comprises means for connecting structural components which includes at least one hook member integral with a first of the components, projecting from the face thereof and engageable in the hole in a second of the components, the hook member having the form of a hollow nose whose free end portion is spaced from the face of the first component and whose side walls approach one another toward the free end.

---

This invention concerns improvements relating to connections between structural components, particularly of racking of the type in which the basic components, namely uprights and beams, are held together by means of hooks provided on the one component and engageable in holes provided in the other component. An object of the invention is to provide means for the establishment of tight and reliable, although releasable, connections, which means are simple to produce and easy to manipulate, as they do not involve loose parts such as bolts or require the use of tools such as spanners. The invention thus seeks to facilitate easy assembly and disassembly of racking of the aforesaid type, for instance robust racking intended more especially for the storage of goods on pallets.

According to the invention, connection means for the purpose set forth comprises a hook member integral with one of the components and engageable in a hole in the other component, the said hook member having the form of a hollow nose whose free end portion is spaced from the adjacent face of the said component and whose side walls approach each other towards the said end. Such a hook member can be produced relatively simply and inexpensively from the material of the component itself, for example by blanking and forming operations only. No welding of a separate part to the component is necessary.

If the inclination of the side walls matches the inclination of the side edges of the hole in which the hook member engages, a double-sided wedging effect can be achieved. This may be arranged to be of either a non-jamming or a tight-jamming nature. In either case, the hollow member has the advantage over a solid hook that the side walls can spring slightly under load and thus permit the hook member to bed down in the hole. This is of particular advantage when two or more vertically spaced hook members are provided on the one component for engaging in two or more holes in the other component, as it avoids the necessity for very precise location of the said members and holes with respect to spacing and alignment. As the side walls are connected by the bridge portion of the nose, the material of the hook member is efficiently utilised, since the load will always be distributed between the two sides of the said member.

A relatively small tip at the free end of the hook member will assist easy entry into the hole, in spite of slight variations in relative position as between the said member and hole. If inclined edges are also provided on the inside of the end portion, this will further assist in guiding the said member into the hole. Inclined inner edges may also be utilised to provide a further wedging action, in this case in a direction normal to the hole. The side walls of the hook member may be flat and straight so that they will engage the side of a hole of complementary shape over a bearing area and not merely at a single point.

An abutment surface may be provided at the root end of the hook member to prevent unintentional dislodgement of the member due to an accidental movement of one of the components. Opposite to the other end, an opening may be formed in the component provided with the hook member. This will enable the nose to be seen, so that correct entry and seating can be checked. This opening, or an opening in the said component at the first-named end, may be used also to accommodate locking means.

One manner in which the invention can be carried into effect will now be more fully described by way of example and with reference to the accompanying drawings, in which:

FIGURE 1 is a perspective view of part of a racking structure, showing portions of two uprights and a beam, FIGURE 2 is a section on the line II—II in FIGURE 1 to a larger scale, FIGURE 3 is a fragmentary perspective view, to an even larger scale, showing from the inside parts of an upright with two hook members, and FIGURES 4, 5, 6 and 7 are a side elevation, front elevation, plan and horizontal sectional view of a hook member.

For the example illustrated, it will be assumed that the racking structure includes two kinds of basic components, namely uprights 1 and horizontal beams 2. As may be seen in FIGURE 1, the uprights are steel sections of rectangular channel shape with inturned lips 3 at the rear edges of their flanges 4 and with two vertical lines of equally pitched holes 5 in their front face 6. The holes 5 are of the shape of a vertically elongated symmetrical diamond with truncated top and bottom ends. The beams 2, which brace pairs of uprights 1 apart to form upright frames, may be of box or channel section. The beam 2 illustrated is composed of two lipped channels interlocked to form a box section. An angle-section vertical bracket 7 is welded to each end of the beam 2. The front flange 8 of each bracket is formed with a plurality, four as shown in FIGURE 1, of hook members 9 for joining the beam 2 to the upright 1 by co-operation with holes 5 in the latter.

As may be seen in detail from FIGURES 3 to 7, each hook member 9 is of hollow nose-like shape and is integral with the flange 8, from the material of which it is produced simply by blanking and forming. In this connection, the cold working in the vicinity of each hook member is advantageous from the standpoint of strength. In the example illustrated, the forming of the hook member 9 is arranged to leave a hole 10 of substantially square shape in the face of the flange 8 opposite to the lower part of the said member, but this is not essential. A substantially rectangular hole 11 may also be formed in the flange 8 above the root end of one or more hook members, as shown for the lower member 9 in FIGURE 3 and in FIGURES 4 to 6.

As seen in front elevation (FIGURE 5), the hollow member 9 is also of a vertically elongated truncated diamond shape, the outer edges of the side walls or cheeks 12 having an external taper which, at least in the lower part of the member, corresponds to that of the edges of the holes 5. In the upper part of the hook member, side-wall parts 13 follow the shape of the upper portion of the diamond shape. The lower end of the hook member is bevelled at 14, as shown, or rounded to facilitate entry into the hole 5. The upper end of the diamond shape is cut across to provide a flat 15 and the cut may, as shown at 16 in FIGURE 6, pentrate to the interior of the hollow member 9. The flat 15 will serve as an abutment surface to prevent accidental dislodgement of the hook member 9, due to an upward force or blow, by engaging with the flat upper end of the hole 5. To avoid risk of jamming of the hook member 9 in the top of the hole 5 during removal, the width of the flat 15 is made slightly less than the width of the top of the hole.

Figure 4:
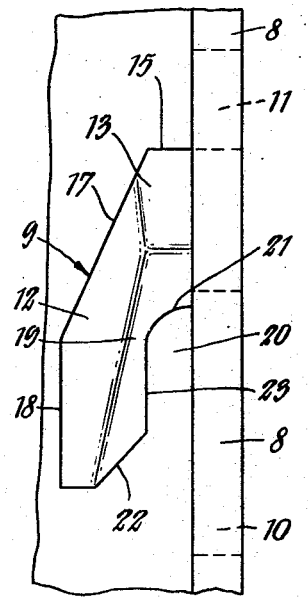
Figure 5:
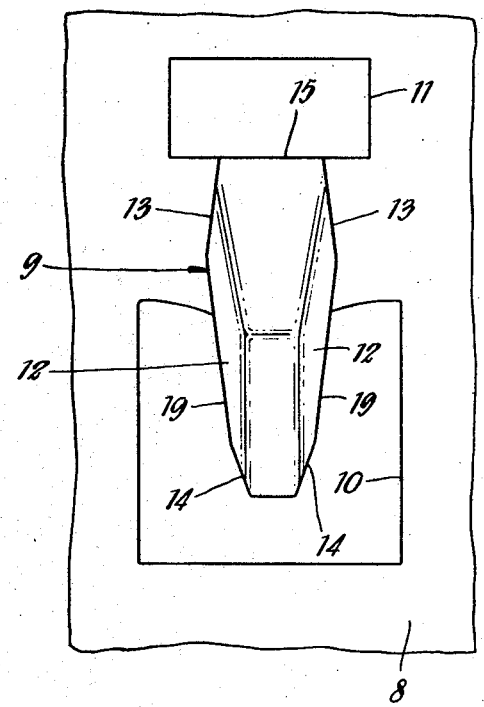
Figure 7:
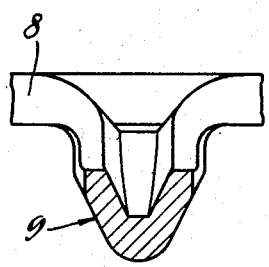
Figure 6:
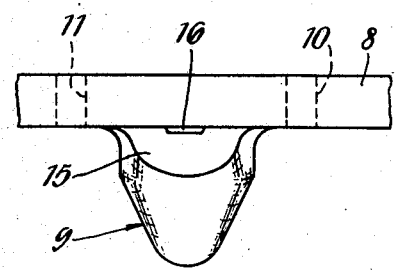

As seen in side elevation (FIGURE 4), the outer contour of the nose-like shape comprises an upper portion 17 with a downward and outward inclination and a lower portion 18 which is vertical, as shown, or has a slightly steeper inclination. The wall thickness (FIGURE 7) is substantially uniform. For the lower half of the hook member, straight flat flank portions 19 of the side walls are each cut away to leave a downwardly open cavity, in relation to the plane of the inner face of the flange 8, such cavity having the appearance of a slot 20 (FIGURE 4). The slot 20 has a rounded upper end 21. It may, if desired, flare slightly downwardly. Inclined edges 22 (FIGURE 4) on the inside of the nose shape, in conjunction with the aforesaid bevelled or rounded lower end, facilitate entry of the hook member 9 into the hole 5. The flank portions 19 taper downwardly towards each other at the same angle as the sides of the lower half of the hole 5, so that the said portions will wedge in the hole and afford rigidity of connection from side to side. A suitable included angle between the flank portions 19 as seen in FIGURE 5 is 14°, which will not produce such tight jamming that the hook member cannot be released from the hole. The inner edges 23 (FIGURE 4) of the flank portions 19 engage with the inner face of the flange 6 of the upright. If desired, edges 23 may be inclined to give a wedging action normally to the flange 6, thus affording additional rigidity of connection from front to back. Externally, the nose shape may be rounded (FIGURE 6), the rounded surface merging into the flat side surfaces.

Use may be made, in conjunction with the hook members 9, of automatic locking devices 24 such as are indicated in FIGURES 1 and 2, but which are not, per se, the subject of this invention. In this case, holes 10 in the flange 8 can be utilised for the mounting of the locking means and a hole 11 to permit the projection of the locking element 25 (FIGURE 2) through the flange into a hole 5 in the flange 6 of the upright.

With hook members of the kind described above, the mounting of a beam 2 between two uprights 1 is a simple task for a single operator. The beam 2 is offered up to the uprights 1 at the required level so that the members 9 of each of the brackets 7 can enter selected holes 5 in the said uprights and, when the beam is pressed downwardly, interengage therewith. The several downwardly inclined surfaces on the hook members assist in guiding the beam into its final position, even if the beam is presented slightly high or otherwise slightly inaccurately. The side walls 12, connected by the bridge portion of the nose, can spring slightly under load and thus permit each hook member to bed down. Also the load will be distributed between the two sides of the said member.

Removal of the beam 2 is also a simple matter, in which the shape of the hook members assists their withdrawal from the holes 5. In particular, the inclined portions 17 will tend, when they engage the tops of the holes 5 during lifting of the beam, to deflect the hook members 9 and, consequently, the beam 2 away from the uprights 1.

As the holes 5 are symmetrical, an upright 1 can be used either way up.

As may be seen from FIGURE 1, there is a slight gap between the side flange 26 of each beam bracket 7 and the adjacent side flange 4 of the upright 1. This avoids risk of jamming of a beam 2 when introduced between two previously fixed uprights 1. It affords some latitude when the beam 2 is offered up and facilitates both positioning and removal of the beam. As will be understood, the two lines of holes 5 permit beams to be mounted on either or both sides of an upright 1.

Generally, a plurality of such hook members 9 will be provided in a vertical line, as shown, or in two or three lines. However, single such members could be used. The hook members need not be on a flange or other face part of a component. They may be provided on an end thereof. They could be used, for instance, for connecting a cantilever component to a support. In this case, two oppositely directed hook members may be arranged so that they can be brought into tight engagement with corresponding holes by a relative turning movement of the component after the said members have been entered into the holes. For some connection purposes, the hook members may be provided in an inverted position on the supporting component and the holes in the supported component.

I claim:

1. Means for connecting structural components comprising at least one hook member integral with and projecting from one flat face of a first said component and engageable in a hole in a flat face of a second said component, the said hook member having the form of a hollow nose comprising side walls connected together by a bridging portion and at its side edges of a root portion connected to the said flat face of the first component, the free portion of the nose not connected to the said face of the said first component being spaced therefrom and the said side walls of the said free portion being substantially parallel to each other but with a taper in the direction towards the said free end thereof.

2. Connection means according to claim 1, wherein the said side walls of the hook member are connected by a ridge directed away from the face of the first component.

3. Connection means according to claim 1, wherein inclination toward the vertical of the said side walls of the root portion of the hook member substantially matches inclination to the vertical of the side edges of the hole in which said member is engageable, so that a wedging effect can be achieved between said edges.

4. Connection means according to claim 1, wherein inclined edges are provided on the inside of the free end of the hook member.

5. Connection means according to claim 1, wherein a flat abutment surface is provided at the root end of the hook member to prevent accidental dislodgement from the said hole in the second component.

6. Connection means according to claim 1, wherein the free end of the hook member is bevelled at the sides to facilitate entry into the hole in the second component.

7. Connection means according to claim 5, wherein the outside surface of the hook member extends for the length of the root portion to the flat abutment surface and is inclined toward its root.

8. Connection means according to claim 1, wherein the hook member is formed from the material of the first component.

9. Connection means according to claim 1, wherein side walls of the hook member are sufficiently resilient to spring slightly under load.

10. Connection means according to claim 1, wherein the hole in the second component has inclined side edges when viewed in front elevation complementary to the side surfaces of the hook member to provide a wedging effect between the two.

11. Connection means according to claim 1, wherein an opening is formed in the first component above the root end of the hook member.

12. Connection means according to claim 1, wherein the hole in the second component is of truncated diamond shape with side edges complementary to the side surfaces of the hook member.

References Cited
UNITED STATES PATENTS

| | | | |
|---|---|---|---|
| 2,540,408 | 2/1951 | Saxe | 287—189.36 |
| 3,055,462 | 9/1962 | Steele | 287—20.5 X |
| 3,217,894 | 11/1965 | Shewell | 287—189.36 X |
| 3,219,157 | 11/1965 | Gordon | 287—189.36 X |

RAMON S. BRITTS, Primary Examiner

U.S. Cl. X.R.

287—20.5